(12) United States Patent
Schimmel

(10) Patent No.: US 11,238,298 B2
(45) Date of Patent: Feb. 1, 2022

(54) ITEM TRACKING USING A DYNAMIC REGION OF INTEREST

(71) Applicant: United States Postal Service, Washington, DC (US)

(72) Inventor: Todd M. Schimmel, Annandale, VA (US)

(73) Assignee: United States Postal Service, Washington, DC (US)

( * ) Notice: Subject to any disclaimer, the term of this patent is extended or adjusted under 35 U.S.C. 154(b) by 22 days.

(21) Appl. No.: 16/821,714

(22) Filed: Mar. 17, 2020

(65) Prior Publication Data

US 2020/0218923 A1    Jul. 9, 2020

Related U.S. Application Data

(63) Continuation of application No. 16/366,403, filed on Mar. 27, 2019, now Pat. No. 10,621,457, which is a
(Continued)

(51) Int. Cl.
| | | |
|---|---|---|
| *G06K 9/32* | (2006.01) | |
| *G06K 9/00* | (2006.01) | |
| *G06T 7/11* | (2017.01) | |
| *G06Q 10/08* | (2012.01) | |
| *H04N 5/232* | (2006.01) | |
| *H04N 7/18* | (2006.01) | |

(52) U.S. Cl.
CPC ....... *G06K 9/3233* (2013.01); *G06K 9/00744* (2013.01); *G06K 9/00771* (2013.01); *G06Q 10/087* (2013.01); *G06Q 10/0833* (2013.01); *G06T 7/11* (2017.01); *H04N 5/23203* (2013.01); *H04N 5/23238* (2013.01); *H04N 7/181* (2013.01)

(58) Field of Classification Search
CPC .......... G06K 9/00711; G06K 9/00771; G06K 9/3233; G06K 9/325; G06T 7/11; G06T 7/174; G06T 7/20; G06T 7/70; G06Q 10/0832; G06Q 10/0833; G06Q 10/087; H04N 5/23238; H04N 5/23245; B07C 3/14; B07C 3/18; B07C 7/005
See application file for complete search history.

(56) References Cited

U.S. PATENT DOCUMENTS

| | | | |
|---|---|---|---|
| 9,102,055 B1 | 8/2015 | Konolige et al. | |
| 2002/0196330 A1* | 12/2002 | Park et al. | H04N 9/8227 348/49 |

(Continued)

OTHER PUBLICATIONS

International Search Report and Written Opinion dated Sep. 21, 2017 in International Application No. PCT/US2017/038612.

*Primary Examiner* — Andrew W Johns
(74) *Attorney, Agent, or Firm* — Knobbe Martens Olson & Bear, LLP

(57) ABSTRACT

Systems, devices, and methods for monitoring items in a defined physical area can include a primary camera configured to detect a region of interest within a defined physical area and the coordinates of the region of interest in the defined physical area. A plurality of secondary cameras can positioned throughout a defined physical area. One of the secondary cameras can be selected to capture an image of a region of interest based on the coordinates of the region of interest.

24 Claims, 7 Drawing Sheets

Related U.S. Application Data continuation of application No. 15/629,048, filed on Jun. 21, 2017, now Pat. No. 10,248,879.

(60) Provisional application No. 62/353,431, filed on Jun. 22, 2016.

(56) References Cited

U.S. PATENT DOCUMENTS

| | | |
|---|---|---|
| 2007/0279494 A1* | 12/2007 | Aman et al. ........... H04N 5/332 |
| | | 348/169 |
| 2010/0158310 A1* | 6/2010 | McQueen et al. ....... G06K 9/00 |
| | | 382/100 |
| 2014/0305850 A1 | 10/2014 | Serjeantson et al. |
| 2015/0012396 A1* | 1/2015 | Puerini et al. ..... G06K 9/00771 |
| | | 705/28 |
| 2015/0363758 A1 | 12/2015 | Wu et al. |
| 2017/0186291 A1* | 6/2017 | Wenus et al. ........... G01S 3/786 |
| 2018/0018788 A1* | 1/2018 | Olmstead ......... H04N 5/232121 |
| 2018/0218224 A1 | 8/2018 | Olmstead et al. |
| 2018/0285611 A1 | 10/2018 | D'ercoli et al. |
| 2019/0228232 A1* | 7/2019 | Lecart et al. ........ G08G 1/0129 |

\* cited by examiner

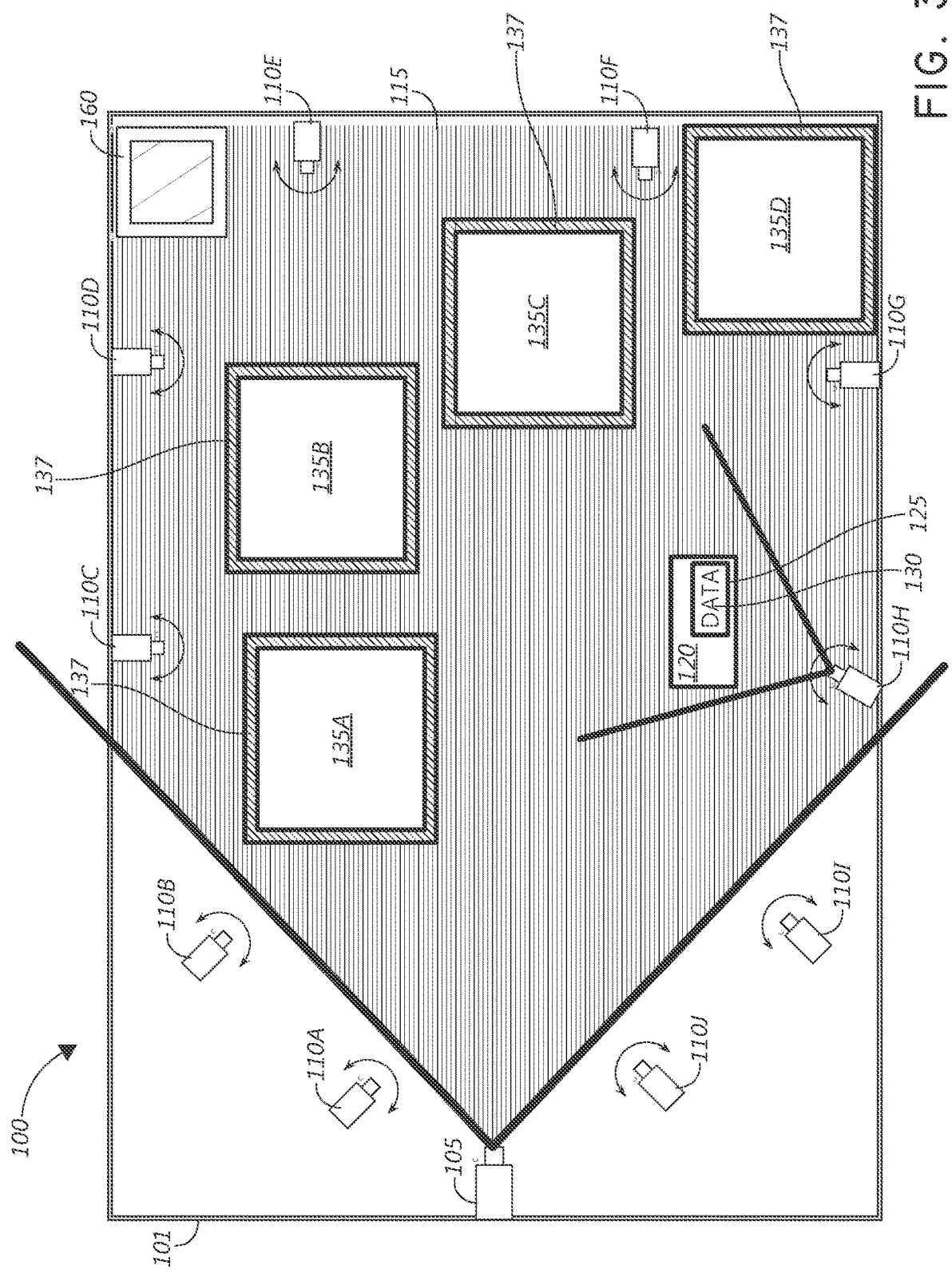

ITEM TRACKING USING A DYNAMIC REGION OF INTEREST

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 16/366,403, filed Mar. 27, 2019, which is a continuation of U.S. patent application Ser. No. 15/629,048, filed Jun. 21, 2017, which claims the benefit of priority to U.S. Provisional Application No. 62/353,431, filed Jun. 22, 2016, the entire contents of each of which are hereby incorporated by reference.

FIELD

This invention relates to tracking items in an area such as a processing facility.

DESCRIPTION OF THE RELATED TECHNOLOGY

In item tracking systems, items can be labeled with a computer readable code, such as a barcode, that can be used to identify the item throughout various stages of delivery. These computer readable codes can store information regarding the intended destination of an item.

SUMMARY

Aspects of the present invention include systems, devices, and methods for monitoring items in a defined physical area using a plurality of cameras.

One aspect is a system for capturing images in a defined physical area. The system includes a primary camera having a field of view comprising a portion of the defined physical area comprising one or more image sensors, wherein the primary camera is configured to receive image data from the one or more image sensors, a plurality of secondary cameras, each secondary camera having a field of view comprising a section of the defined physical area, each secondary camera comprising one or more image sensors configured to capture an image, and one or more processors configured to determine a set of spatial coordinates of a potential region of interest within a defined physical area based on image data received by the image sensors of the primary camera, determine one of the plurality of secondary cameras to capture an image of the potential region of interest based on the determined set of spatial coordinates, and instruct the one of the plurality of secondary cameras to capture an image of the potential region of interest.

Another aspect is a method for capturing images in a defined physical area. The method includes detecting, via a primary camera, a potential region of interest, determining spatial coordinates of the potential region of interest, determining a secondary camera of a plurality of secondary cameras to capture an image of the potential region of interest based at least in part on the determined spatial coordinates, and capturing an image of the potential region of interest by the determined secondary camera.

Another aspect is a system for capturing images in a defined physical area. The system includes primary means for receiving image data having a field of view comprising a portion of the defined physical area, a plurality of secondary means for receiving image data, each secondary means for receiving image data having a field of view comprising a section of the defined physical area, means for processing image data received by the primary means for receiving image data to determine a set of spatial coordinates of a potential region of interest within a defined physical, and determine one of the plurality of secondary means for capturing image data to capture an image of the potential region of interest based on the determined set of spatial coordinates, and means for instructing the one of plurality of secondary means for capturing image data to capture an image of the potential region of interest.

In another aspect described herein, system for sorting an item comprises a primary camera having a field of view comprising a portion of a defined physical area, the primary camera in communication with a central unit, and where the primary camera is configured to identify an item within the defined physical area; a plurality of secondary cameras in communication with the central unit, each of the plurality of secondary cameras having a field of view comprising a section of the defined physical area; and wherein the central unit comprises one or more processors configured to: determine spatial coordinates of a region of interest located on the item within a defined physical area, based on image data received by the primary camera; identify one or more of the plurality of secondary cameras having a field of view including the determined spatial coordinates; and cause the identified one or more of the plurality of secondary cameras to capture an image of the region of interest.

In some embodiments, the one or more processors are further configured to process an image of the region of interest to extract machine readable information located within the region of interest.

In some embodiments, the information comprises an intended delivery destination for the item.

In some embodiments, the one or more processors are further configured to identify a location within the defined physical area for placement of the item based on the intended delivery destination for the item.

In some embodiments, the region of interest comprises a segment of an item, wherein the machine-readable information comprises one or more of information associated with identifying the item, tracking the item, a destination of the item, a source or sender of the item, sorting data, and routing information regarding the item.

In some embodiments, the potential region of interest comprises a segment of an item, wherein the one or more processors are configured to provide instructions to one or more of the primary camera and the plurality of secondary cameras to capture image data related to the movement of the item having the potential region of interest; and determine if the item having the potential region of interest is deposited in a container.

In some embodiments, the processor is further configured to store data associating an item with a container in which the item is deposited.

In some embodiments, the system further comprises one or more indicators configured to provide an indication of the determined location within the defined physical area for placement of the item.

In another aspect, a method for tracking items comprises detecting, via a primary camera, a potential region of interest located on an item within a defined physical area; determining spatial coordinates within the defined physical area of the potential region of interest; determining a secondary camera of a plurality of secondary cameras to capture an image of the potential region of interest based at least in part on the determined spatial coordinates; and capturing an image of the potential region of interest by the determined secondary camera.

In some embodiments, the method further comprises extracting machine-readable information from in the region of interest.

In some embodiments, the method further comprises determining a location within the defined physical area for placement of the item based on the information extracted from the region of interest; and indicating the determined location within the defined physical area for placement of the item.

In some embodiments, the method further comprises capturing image data related to the movement of the potential region of interest; and processing the captured image data related to the movement of the potential region of interest to determine information regarding the location of the potential region of interest.

In some embodiments processing the captured image data related to the movement of potential region of interest comprises determining that the item was deposited in a container located within the defined physical area.

In another aspect, a system for capturing images in a defined physical area, the system comprises means for detecting a potential region of interest located on an item within a defined physical area; means for determining spatial coordinates within the defined physical area of the potential region of interest; means for determining a secondary camera of a plurality of secondary cameras to capture an image of the potential region of interest based at least in part on the determined spatial coordinates; and means for capturing an image of the potential region of interest by the determined secondary camera.

BRIEF DESCRIPTION OF THE DRAWINGS

FIG. 3B depicts an example of camera system in a second stage of monitoring an item in a defined physical area.

DETAILED DESCRIPTION

Figure 1:
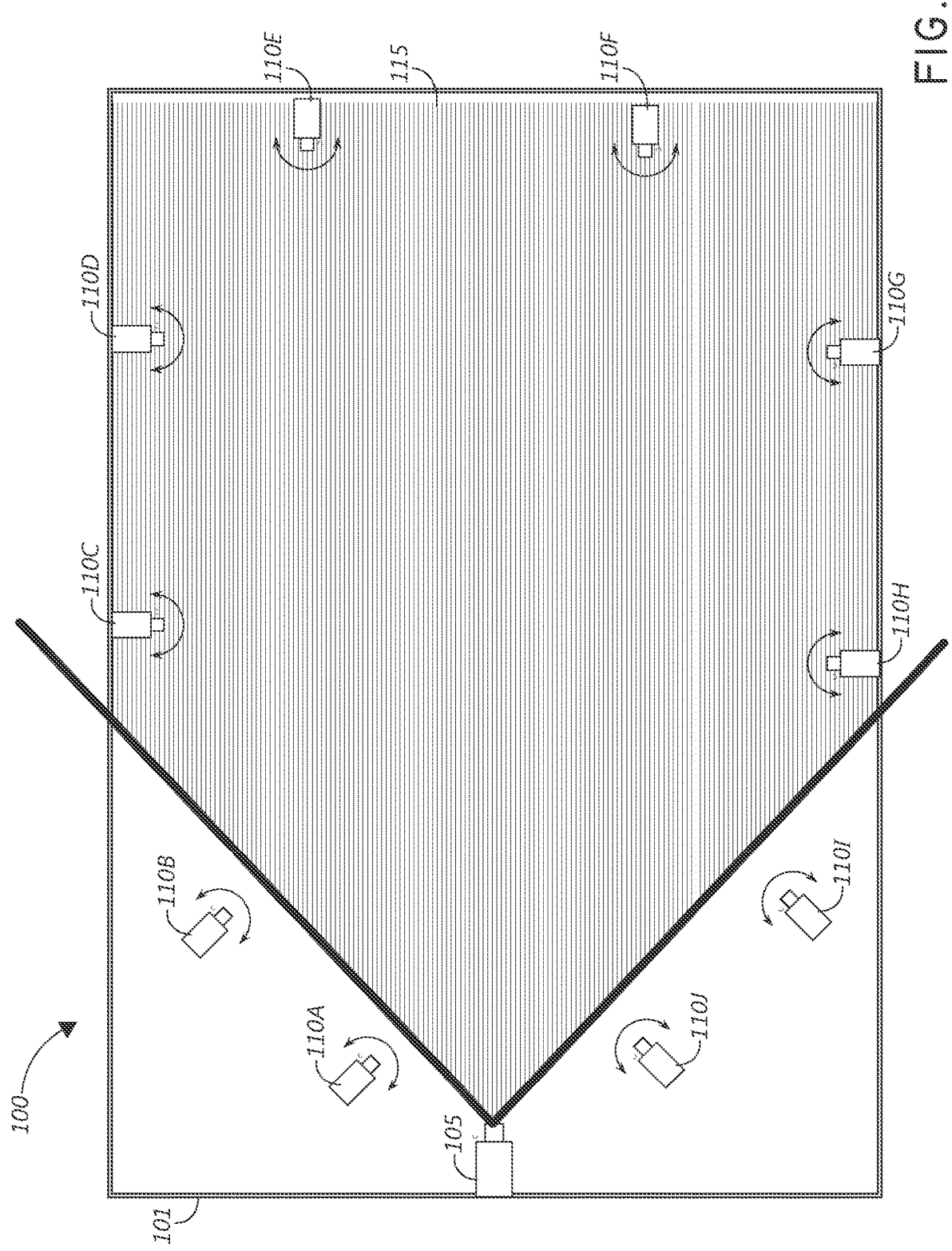
FIG. 1 depicts an embodiment of a camera system for monitoring items in a defined physical area.

As will be appreciated by one skilled in the art, there are numerous ways of carrying out the examples, improvements, and arrangements of an item tracking system in accordance with embodiments of the invention disclosed herein. Although reference will be made to the illustrative embodiments depicted in the drawings and the following description, these embodiments are not meant to be exhaustive of the various alternative designs and embodiments that are encompassed by the disclosed invention. Those skilled in the art will readily appreciate that various modifications may be made, and various combinations can be made, without departing from the invention.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

As used herein, an item, or a distribution item, can be a parcel, a package, an envelope, a flat, a mailpiece, a box, a suitcase, or any other item that can be transported from one location to another by a distribution entity. A distribution entity may be an entity engaged in receiving, sorting, and/or transporting items from one location to another, such as the United States Postal Service (USPS), another commercial carrier, a storage facility, a fulfillment warehouse, a luggage sorting facility, or any other similar facility, company, or entity.

Using the USPS as an example, an item, such as a parcel, mailpiece, or the like has a label thereon, or information printed directly on the item (also referred to as a label herein), which indicates, among other things, a sender, a delivery point (destination), a class of service, postage, and a tracking code. The labels include computer readable codes which can encode the above items of information. The labels can directly encode the above and other information, or can encode a code that is associated with the above and other information.

As used therein, the term "camera" can refer to any type of image capture device capable of capturing an image, for example, a digital camera, an optical scanner, a barcode reader, and the like.

As used herein, the term "region of interest" can refer to a portion of an item within a defined physical area that contains a machine-readable code, label, image, and the like. For example, a region of interest may be a section or portion of an item that includes written, printed, or encoded information such as a barcode, a QR code, a destination address, a return address, payment information such as postage, item information such as weight, dimensions, contents, the item sender, originator, and the like.

A distribution item in a distribution system can include a computer readable label thereon. The label may be scanned, for example, during sorting, prior to depositing in a storage container, prior to depositing in a vehicle for transport, when unloading from a vehicle, and when delivered to a final destination. Throughout the delivery process, an item may be transported to and handled at multiple item delivery facilities. The item may also be moved between multiple storage containers and transportation vehicles. Employees in a delivery facility may handle and load items into a desired storage container or vehicle, and scan the label on the item at each stage in order to provide a complete and accurate history of the item's location. In some instances, items are moved throughout a facility using conveyor belts and other equipment to sort items for delivery according to destination. Label scanners may be positioned to read labels on the items as they are being sorted by the sorting equipment. Information from the labels can be utilized for tracking and routing of items.

Some aspects of the present disclosure describe a system for identifying and processing items using a series of cameras within an area, such as an area of the processing facility. For example, a processing facility can include an item sorting area. The area is monitored by one or more cameras capable of imaging labels on items and interpreting the computer readable codes thereon. When an item having a label thereon is moved into the monitored area, such as for sorting, one or more of the cameras identifies the item, focuses on the label, identifies a region of the label having the computer readable code, and reads the code. The camera, or a processor, interprets the image and the computer readable code to identify the intended destination of an item. The system then displays a sorting location for the item, such as bin, hamper, pallet, and the like, where the item should be placed. As the item is placed in the sorting location, the processor updates an item tracking database, storing the location of the item in the database.

In one embodiment, a camera system is provided that is configured to monitor a defined area to identify potential regions of interest for further image processing. The camera system can include a plurality of cameras viewing a defined physical area including a primary camera and several secondary cameras. The primary camera can be positioned to view the entirety of the defined physical area. The defined physical area can be a sorting room, a staging area, a loading dock, or other facility or portion of a facility where items are sorted and/or staged for further processing and delivery. The secondary cameras can be positioned at several locations within the defined physical area, each secondary camera being positioned to view a section of the defined physical area and configured to capture images within the section of the defined physical area.

The primary camera may further include a processor configured to determine a potential region of interest, such as the location of a computer readable code on an item, and the spatial coordinates thereof within the defined physical area. The primary camera can also include a communication module configured to transmit data to an external device, such as for example, spatial coordinate data for a region of interest.

The camera system may further include a central unit having a communication module, a processor, and a memory. In some embodiments, the primary camera is in communication with a central unit, which is configured to process and interpret the images, and which can be in communication with one or more other processors and one or more memories, such as, for example, an item database.

The central unit can be configured to receive data from the primary camera via the communication module and process the data to determine which of the secondary cameras is suitable for capturing an image of the potential region of interest. The central unit can transmit data to the determined secondary camera(s) including the spatial coordinates of the potential region of interest and/or instructions for adjustment of camera position and/or focus in order to capture or maintain an image of the potential region of interest within the camera's field of view. Each secondary camera can include a communication module configured to receive data from the central unit. Each secondary camera may also include a processor configured to process spatial coordinate data in order to determine adjustments in camera positioning and focus in order to capture an image of the potential region of interest. Each of the secondary cameras can include one or more actuators or motors configured to perform pan, tilt, and/or zoom functions in order to capture an image of the potential region of interest, or to follow the region of interest through the defined physical area. Following adjustment of a secondary camera to the potential region of interest, the secondary camera can capture an image of the potential region of interest, or move to maintain a field of view which includes the region of interest, which can be transmitted to the central unit for processing. The central unit may parse the captured image or a video feed of the potential region of interest for data, such as for example, a label, which may be utilized to track an item upon which the region of interest is positioned. Examples of items that may include a region of interest include delivery items, containers, and transport vehicles.

Using the described system, an item having a region of interest thereon can be tracked within the defined physical area and a position of the item within the defined physical area can be tracked, determined, and recorded. For example, the described system can determine and record the position or placement of an item within a container, a defined staging area, portion of a loading dock, or transport vehicle. The system can then associate the item with the corresponding container or transport vehicle.

In some embodiments, a storage unit, a container, or a transportation vehicle may be within the defined area. These may also include one or more regions of interest having information that can be extracted by the camera system. The storage unit, staging area, loading dock, container, or transport vehicle may include encoded information in the region of interest identifying the storage unit, staging area, loading dock, container, or transport vehicle. An item may have encoded information in its region of interest identifying the item as a specific item, such as a parcel, package, letter, flat, and the like. In some embodiments, the camera system can determine that an item has been deposited within a container, a staging area, a portion of a loading dock, or a transport vehicle by determining that the item is positioned at a set of spatial coordinates within a set of spatial coordinates occupied by the storage unit, container, staging area, portion of a loading dock, or transport vehicle. In some embodiments, the camera system can determine the item has been placed in a container, storage unit, or vehicle by analyzing an image of the item in proximity to the region of interest on the container, storage unit, or vehicle. If the item is within a predefined area on the image, such as within a predefined number of pixels, the system can determine the item is within the container, storage unit, or vehicle, and the system can update the item location in the item database. In some embodiments, the image is analyzed to determine an actual distance the item is from the container, storage unit, or vehicle. If the determined actual distance is within a predetermined threshold from the container, storage unit, or vehicle, then the item can be determined to be in the container, storage unit, or vehicle, and the item location can be updated in the item database.

In some embodiments, a processor may perform logical operations to differentiate between an item and a container or transport vehicle based on size, shape, or any other detectable characteristic. The processor may determine that an item is deposited within a container or transport vehicle based on receipt of image data through one or more of the primary camera and the secondary cameras showing the item within or partially within the container or transport vehicle. When an item is determined to be within an container, storage unit, or transport vehicle, the processor can update the item's position in the database, such as associating the container, storage unit, or vehicle with at least a portion of the computer readable code, or with a unique item identifier.

FIG. 1 depicts a camera system 100 for monitoring items within a defined physical area positioned within a room 101. The room 101 can be a portion of a distribution facility, such as a loading dock, a sorting station, a warehouse, or any other facility or area. The camera system includes a primary camera 105 and a plurality of secondary cameras 110A-J. The camera system 100 is configured to monitor a defined physical area 115 for items having potential regions of interest. The defined physical area is the portion of the room 101 which is within the field of view of the primary camera 105, or which is within a potential field of view of the primary camera 105, as the primary camera 105 moves or pans about the room. At least portions of the defined physical area 115 are also within the field of view of one or more of the secondary cameras 110A-J.

The primary camera 105 is configured to monitor the entirety of the defined physical area 115 for potential regions of interest and to determine the spatial coordinates thereof. The primary camera 105 can be positioned so that the entirety of the defined physical area 115 is within its field of view. The field of view of the primary camera 105 corresponds to the visible area captured by image sensors (not shown) of the primary camera 105, and may be constrained by a size of a two-dimensional camera sensor array (e.g., number of row and column pixels on an image sensing chip) and the desired resolution of an image. The resolution may be measured in dots per inch (DPI). For example, when using an overhead primary camera 105, the desired resolution may be affected by the size of the camera sensor array and the height of the camera over an object being scanned. A primary camera 105 positioned further away from a particular area may have a larger field of view than a primary camera 105 positioned closer to the area, but may have a lower resolution. The primary camera 105 can have a sufficiently high DPI to detect potential regions of interest within the entirety of the defined physical area 115. The primary camera 105 may further be configured to determine the spatial coordinates of a potential region of interest within the defined physical area 115. Spatial coordinates can include coordinates in two or three dimensions. For example, the primary camera 105 can be configured to determine x, y, and z coordinates of a potential region of interest within the defined physical area 115. In some embodiments, the primary camera 105, itself or by a processor in communication with the primary camera 105 can receive an image of at least a portion of the defined physical area 115. A processor analyzes the image to identify a portion of the image having a computer readable code thereon. The image includes metadata or other data associated with the image, such as the position, angle, depth of field, etc., of the primary camera 105 when the image was taken. The processor takes the image and related data, and the determination of the region of interest, and converts the image data into spatial coordinates corresponding to a three-dimensional location within the defined physical area 115. The conversion of image data can be done according to algorithms including the camera position, structural features in the image, which may be identified in the defined physical area 115 using high contrast markings, and the like, or which can correspond to the floor, a wall, etc. The converted image data is provided to a processor, or can be used within the processor that analyzed the image. This data is converted into instructions to the secondary cameras 110A-J on how to move, pan, zoom, and/or focus in order to capture the region of interest on the items.

In some embodiments, the central unit 140 can receive an image of the potential region of interest, and can convert the image from a color image to a grayscale image for further processing, or to improve speed of subsequent processing. The central unit 140 can convert an image from one file format to another as desired or required for decoding the information in the image. In some embodiments, the central unit 140 receives the image of the potential region of interest, identifies the portion of the image having the potential region of interest therein, and crops or trims the image to only process the portion of the image having the potential region of interest therein.

Each of the secondary cameras 110A-J are positioned to monitor a section of the defined physical area 115 and to capture images within that section of the defined physical area 115. Each of secondary cameras 110A-J can be selectively adjustable to different orientations in order to facilitate the capture of images within the section monitored by that particular secondary camera. For example, the secondary cameras 110A-J can include pan, tilt, and zoom functionality in order to capture images of potential regions of interest, where panning generally refers to rotation in a horizontal plane and tilting generally refers to rotation in a vertical plane, and zooming refers to changing the focal point of a lens system. The secondary cameras 110A-J may be pan-tilt-zoom cameras, in which the direction of the camera can be adjusted through physical camera movement, or virtual pan-tilt-zoom cameras, in which a camera digitally pans, tilts, and zooms into portions of an image.

In some embodiments, one or more of the secondary cameras 110A-J are configured to capture an image of a potential region of interest at a set of spatial coordinates detected by the primary camera 105 or to follow the region of interest through the defined physical area 115. Each of the secondary cameras may be configured to capture an image with a resolution sufficient for the reading and processing of data within the potential region of interest. For example, each of the secondary cameras 110A-J may have a sufficiently high DPI to support optical character reading (e.g., 200 DPI or greater) as well as barcode decoding. In some embodiments, the secondary cameras 110A-J are positioned and configured such that at least one of the secondary cameras 110A-J is capable of capturing a machine-readable image of a region of interest at each set of spatial coordinates within the defined physical area 115 or to follow the region of interest through each set of spatial coordinates within the defined physical area 115. By using one or more secondary cameras 110A-J, the possibility that the region of interest is within the field of view of at least one of the secondary cameras 110A-J.

When the primary camera 105 and/or an associated processor identifies the spatial coordinates of the potential region of interest, the primary camera 105 and/or the associated processor determines which of the secondary cameras 110A-J is likely to have the closest, clearest, or best image of the potential region of interest, and instructs that secondary camera to take an image, to pan, tilt, or zoom to capture an image of the potential region of interest.

The defined physical area 115 for monitoring by a camera system 100 is not limited to the particular shape or size of defined physical area 115, but can include an area of any shape or size. The camera system 100 is not limited to the configuration shown in FIG. 1. The primary camera 105 may be positioned in any position capable of receiving image data for an entirety of the defined physical area 115, for a substantial portion of the defined physical area 115, or for any desired portion of the defined physical area 115. Any number of secondary cameras 110A-J may be used in any configuration so that at least one secondary camera 110 is capable of capturing an image of a region of interest at each spatial coordinate within the defined physical area 115. In some embodiments, the secondary cameras 110A-J can be disposed radially or circumferentially around the defined physical area 115. In some embodiments, the secondary cameras 110A-J can be disposed such that some secondary cameras 110A-J are mounted higher on a wall and some are mounted lower on a wall. In some embodiments, the primary camera 105 and/or one or more secondary cameras 110A-J can be mounted over head of the defined physical area 115.

Figure 2:
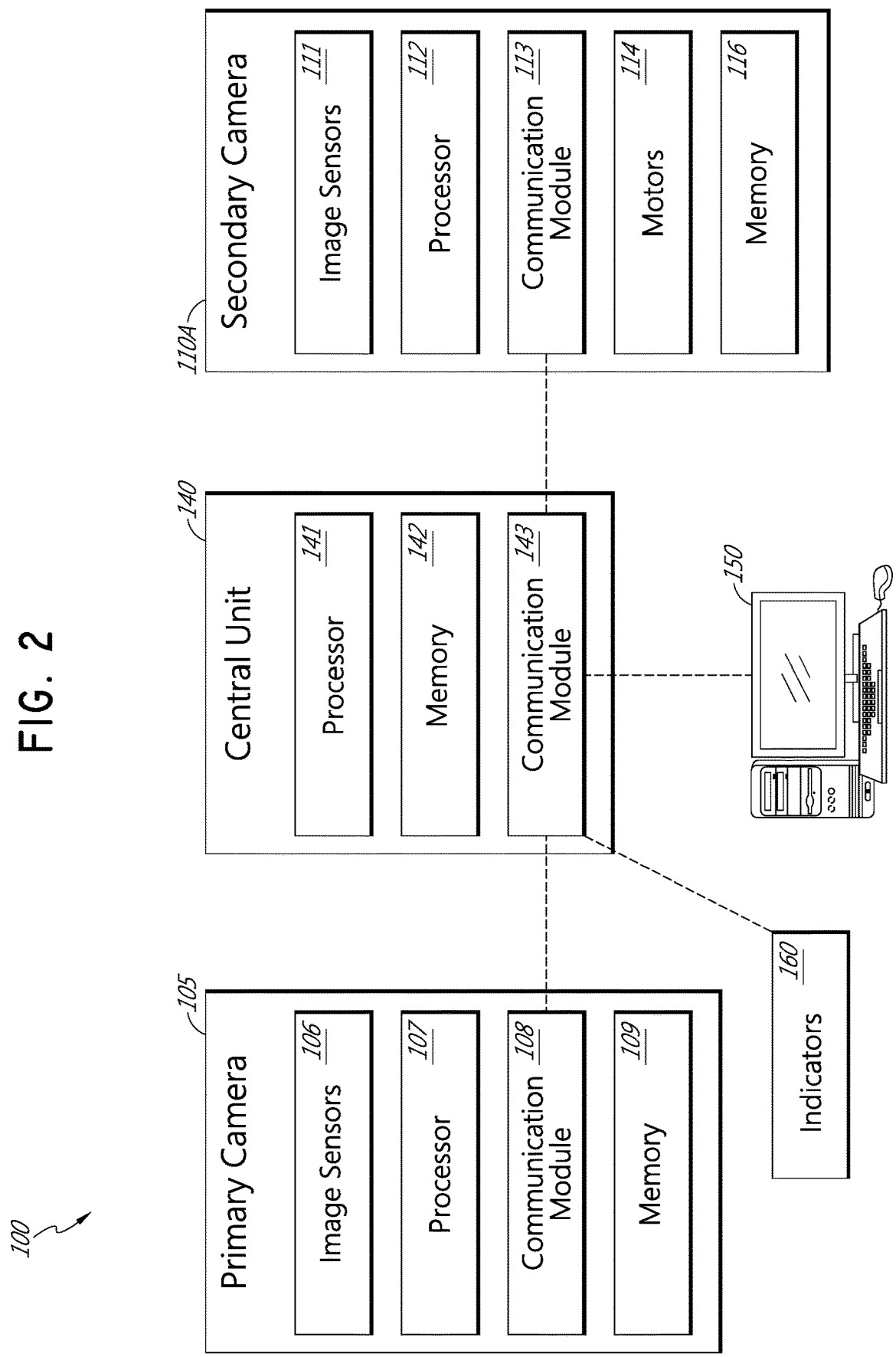
FIG. 2 depicts a block diagram of an embodiment of a camera system.

FIG. 2 depicts a block diagram of the camera system 100. The camera system 100 includes the primary camera 105, the secondary camera 110A, a central unit 140, a computer system 150, and one or more indicators 160. Although FIG. 2 depicts only secondary camera 110A, it should be recognized that the features and functionality described with respect to secondary camera 110A can be present in each of the secondary cameras 110A-J.

The primary camera 105 includes one or more image sensors 106, a processor 107, a communication module 108, and a memory 109. The image sensors 106 may be charge-coupled device (CCD) pixel sensors, complementary metal-oxide-semiconductor (CMOS) pixel sensors, hybrid CCD/CMOS image sensors or N-type metal-oxide-semiconductor (NMOS) image sensors. The processor 107 can control operations of the primary camera 105. The processor 107 may perform logical and arithmetic operations based on program instructions stored within the memory 109. The memory 109, which may include both read-only memory (ROM and random-access memory (RAM), provides instructions and data to the processor 107. A portion of the memory 109 may also include non-volatile random-access memory (NVRAM). The instructions in the memory 109 may be executable to implement the methods described herein.

The processor 107 is configured to receive and process data from the image sensors 106 to determine the presence of an item within the defined physical area, and to identify one or more potential regions of interest on the item. The processor 107 is further configured to process data from the image sensors 106 to determine spatial coordinates of the one or more potential regions of interest. The memory 109 can be used to store instructions for processing image sensor data using the processor 107. In some embodiments, spatial coordinates are determined based on distances from the primary camera 105. In other embodiments, spatial coordinates may be determined based on a programmed reference map having coordinate data for the primary camera 105 and secondary cameras 110A-J. Information determined by the processor 107, such as the spatial coordinates of a potential region of interest, can be stored in the memory 109 and/or transmitted to the central unit 140 using the communication module 108.

The communication module 108 may include communication circuitry to allow for the transmission and/or reception of data between the primary camera 105 and one or more external devices, including the central unit 140. For example, data related to the spatial coordinates of a potential region of interest may be transmitted from the primary camera 105 to the central unit 140 via the communication module 108. The communication module 108 may be configured to communicate via any wired or wireless communication technologies, such as, for example, Bluetooth, WIFI, or other means. In some embodiments, the central unit 140 may be used to control the operation of the primary camera 105 by transmitting data to the communication module 108.

The central unit 140 includes a processor 141, a memory 142, and a communication module 143. The processor 141 can control operations of the central unit 140. The processor 141 may perform logical and arithmetic operations based on program instructions stored within the memory 142. The memory 142, which may include both read-only memory (ROM and random-access memory (RAM), provides instructions and data to the processor 141. A portion of the memory 142 may also include non-volatile random-access memory (NVRAM). The instructions in the memory 142 may be executable to implement the methods described herein. The memory 142 can also be used to store instructions for processing data received from the primary camera 105 and the one or more secondary cameras 110A-J. Information determined by the processor 141 can be stored in the memory 142 and/or transmitted to the primary camera 105, the secondary cameras 110A, the computer system or database 150, the indicators 160, and/or the central unit 140 using the communication module 143. The database 150 can be located with the central unit 140, or can be remote from the central unit 140, and can comprise one or more servers, processors, memories, and the like.

The communication module 143 may include communication circuitry to allow for the transmission and/or reception of data between the central unit 140 and one or more external devices, including the primary camera 105, and the secondary camera 110A. The communication module can also transmit data to and/or receive data from database 150. The communication module can also transmit data to and/or receive data from the indicators 160. For example, data related to the spatial coordinates of a potential region of interest may be transmitted from the primary camera 105 to the communication module 143 of central unit 140. The communication module 143 may be configured to communicate via any wired or wireless communication technologies, such as, for example, Bluetooth, WIFI, or other means. The database 150 also can store information about the sort plan, the intended delivery destination of items, containers, and transport vehicles, the layout of the staging areas and loading docks, and other information about the room 101. For example, the database The processor 141 is configured to receive and process data, such as images or live video, from the primary camera 105 in order to determine the spatial coordinates of one or more potential regions of interest. The processor 141 can also determine which direction the potential region of interest is facing, for example, whether the label on the item is facing up, down, to the side, or at another angle. Based on the spatial coordinate data received from the primary camera 105, the processor 141 can determine which of the secondary cameras 110A-J is capable of capturing a high-quality image of the potential region of interest determined by the primary camera 105. The processor 141 can also determine one or more adjustments to be performed by the one or more of the secondary cameras 110A-J in order to identify and/or capture an image or video of the potential region of interest, such as, for example pan, tilt, and/or zoom adjustments. Information regarding adjustments to be performed by one or more of the secondary cameras 110A-J and instructions to capture an image of a potential region of interest can be transmitted to the one or more of the secondary cameras 110A-J.

The central unit 140 can also be configured to receive images captured by the secondary cameras 110A-J or video streams or feed from the secondary cameras 110A-J, including live video feeds. The processor 141 can be configured to process the images or video to determine if a potential region of interest includes readable information and/or to extract readable information. For example, the processor 141 can be configured to decode labels such as barcodes, perform optical character recognition, identify images, etc. The readable information extracted by the processor 141 can be stored in the memory 142 or transmitted to the external computer system 150, at which the readable information can be stored, managed, or further processed. The extracted information may be used to allow for further tracking, managing, and processing of an item having the potential region of interest thereon.

In some embodiments, the processor 141 can be configured to determine instructions for actuation of the one or more indicators 160. The central unit 140 can transmit instructions to the one or more indicators 160 to indicate one or more of an item within the defined physical area, the intended location within the defined physical area in which an item should be placed, and a resource, such as an employee, vehicle, conveyor, and the like, is assigned to move the item from its current location to the intended location. The intended location can be associated with the intended destination for the item, as interpreted by the processor 141 using or from the computer readable code in the region of interest. In this way, the processor 141 causes the one or more indicators 160 to actuate, illuminate, display, sound, or otherwise respond based on the readable information extracted from images or video of the regions of interest on items. The indicators 160 can include one or more visible, auditory, and/or haptic indicators. For example, the indicators 160 can include one or more display panels, lights, and/or speakers. Each indicator 160 can further include processing circuitry for processing instructions received from the central unit 140 and for actuating an indication based on the instructions received from the central unit 140.

In some embodiments, the indicator 160 may be on a mobile computing device held, operated, or worn by the resource. For example, a personal digital assistant, a mobile delivery device, or a smartphone can display the intended location in which to place the item, or can emit an audible signal, such as speech, indicating the intended location. In some embodiments, the indicator may be part of a wearable computer, such as smart glasses and the like, which can display a heads-up display type message, or which can display an augmented reality type indicator of the intended location as the wearer looks around the defined physical area 115. For example, if the resource looks at the intended location, the location can be highlighted by a lighted area, a square or circle, or other augmented reality type indicator visible through the lens of a wearable computing device. Each indicator 160 can include a communication module for transmitting data to and/or receiving data from the central unit.

The secondary camera 110A includes one or more image sensors 111, a processor 112, a communication module 113, one or more motors 114, and a memory 116. The image sensors 111 may be charge-coupled device (CCD) pixel sensors, complementary metal-oxide-semiconductor (CMOS) pixel sensors, hybrid CCD/CMOS image sensors or N-type metal-oxide-semiconductor (NMOS) image sensors. The processor 112 controls operations of the secondary camera 110A. The processor 112 performs logical and arithmetic operations based on program instructions stored within the memory 116. The memory 116, which may include both read-only memory (ROM and random-access memory (RAM), provides instructions and data to the processor 112. A portion of the memory 116 may also include non-volatile random-access memory (NVRAM). The instructions in the memory 116 may be executable to implement the methods described herein.

The communication module 113 may include communication circuitry to allow for the transmission and/or reception of data between the secondary camera 110A and the central unit 140. For example, data providing instructions to capture an image of a potential region of interest at a particular set of spatial coordinates may be received at the communication module 113 from the central unit 140. Data providing instructions to adjust the configuration of the secondary camera 110A can also be received by the communication module 113. The communication module 113 may be configured to communicate via any wired or wireless communication technologies, such as, for example, Bluetooth, WIFI, or other means.

The one or more motors 114 can include one or more motors configured to cause rotational movement of the secondary camera 110A in horizontal and/or vertical planes in order to perform pan and/or tilt functions. The one or more motors 114 can further include one or more motors configured to adjust a lens assembly (not shown) of the secondary camera 110A in order to adjust the focal length of the lens assembly for performance of zoom functions.

The processor 112 is configured to receive and process data from the central unit 140 in order to determine a set of spatial coordinates at which to capture an image and to determine adjustments to the configuration of the camera 110A, such as pan, tilt, and/or zoom adjustments, required to capture an image at the aforementioned spatial coordinates. The processor 12 is further configured to determine adjustments to the configuration of the camera 110A, such as pan, tilt, and/or zoom adjustments, required to follow an item and a region of interest as they move through the room 101. The processor 111 is further configured to actuate the one or more motors 114 to adjust the secondary camera 110A, for example, to a configuration for capturing an image at the desired spatial coordinates. The processor 111 can also actuate the image sensors 111 to capture an image, for example, at the desired spatial coordinates. The processor 111 can further be configured to process data from the image sensors 106 and to transmit image data, such as for example, a captured image, to the central unit 140.

The memory 116 can be used to store instructions for processing data using the processor 111. Information determined by the processor 111 can be stored in the memory 116 and/or transmitted to the central unit 140 using the communication module 113.

In some embodiments the camera system 100 can be configured to monitor or follow movement of an item having a potential region of interest thereon within the defined physical area 115. For example, if the processor 141 determines that an item includes a region of interest having readable information, the processor can provide instructions to one or more of the primary camera 105 and secondary cameras 110A to monitor movement of the item, for example, by receiving image data related to the location of the item within the defined physical area and processing the received image data to determine the location of the item within the defined physical area.

In some embodiments, an item having a potential region of interest is an item for delivery. In such embodiments, the primary camera 105 and/or secondary cameras 110A-J can be configured to determine if the item is deposited in a storage or transport container. One of processor 107, processor 141, and processor 112 may perform logical operations to differentiate between the item and the container or transport vehicle based on size, shape, or any other detectable characteristic. One of the processor 107, the processor 141, and the processor 112 may determine that an item is deposited within a container or transport vehicle based on receipt of image data through one or more of the primary camera 105 and the secondary cameras 110A-J showing the item within or partially within the container or transport vehicle.

In some embodiments, both an item and a container or transport vehicle can include potential regions of interest. The storage unit or transport vehicle may include encoded information in its region of interest identifying the storage unit or transport vehicle as a container or transport vehicle. The item may have encoded information in its region of interest identifying the item as a parcel or mail piece. In some embodiments, the camera system can determine that the item has been deposited within the container, within a staging area, a portion of a loading dock, or a transport vehicle by determining that the item is positioned at a set of spatial coordinates within a set of spatial coordinates occupied by the container, staging area, loading dock portion, or transport vehicle.

In some embodiments, the storage or transport container may further include readable information such as a barcode or QR code that can be captured by the primary camera 105 and/or secondary cameras 110A-J in order to identify the storage or transport containers. The primary camera 105 and/or secondary cameras 110A-J can transmit data related to a storage or transport container in which the item is deposited to the central unit 140. The processor 141 can process storage or transport container data to associate a particular storage or transport container with the item. The item and container association information can be stored in the memory 142 or transmitted to the external computer system 150 for further tracking, managing, and processing. The item and container association information may be used to allow for further tracking, managing, and processing of an item.

In some embodiments, the defined physical area 115 can have certain spatial coordinates mapped to specific intended locations. For example, a portion of the floor of a loading dock can be mapped to a first sort area, a second portion can be mapped to a second sort area, and so on for as many sort areas as are needed. The sort areas can comprise pallets or other similar devices. These sort areas may not have a computer readable code or region of interest associated with them, and they are identified based on their spatial coordinates. and the like, as will be described elsewhere herein.

Figure 3A:
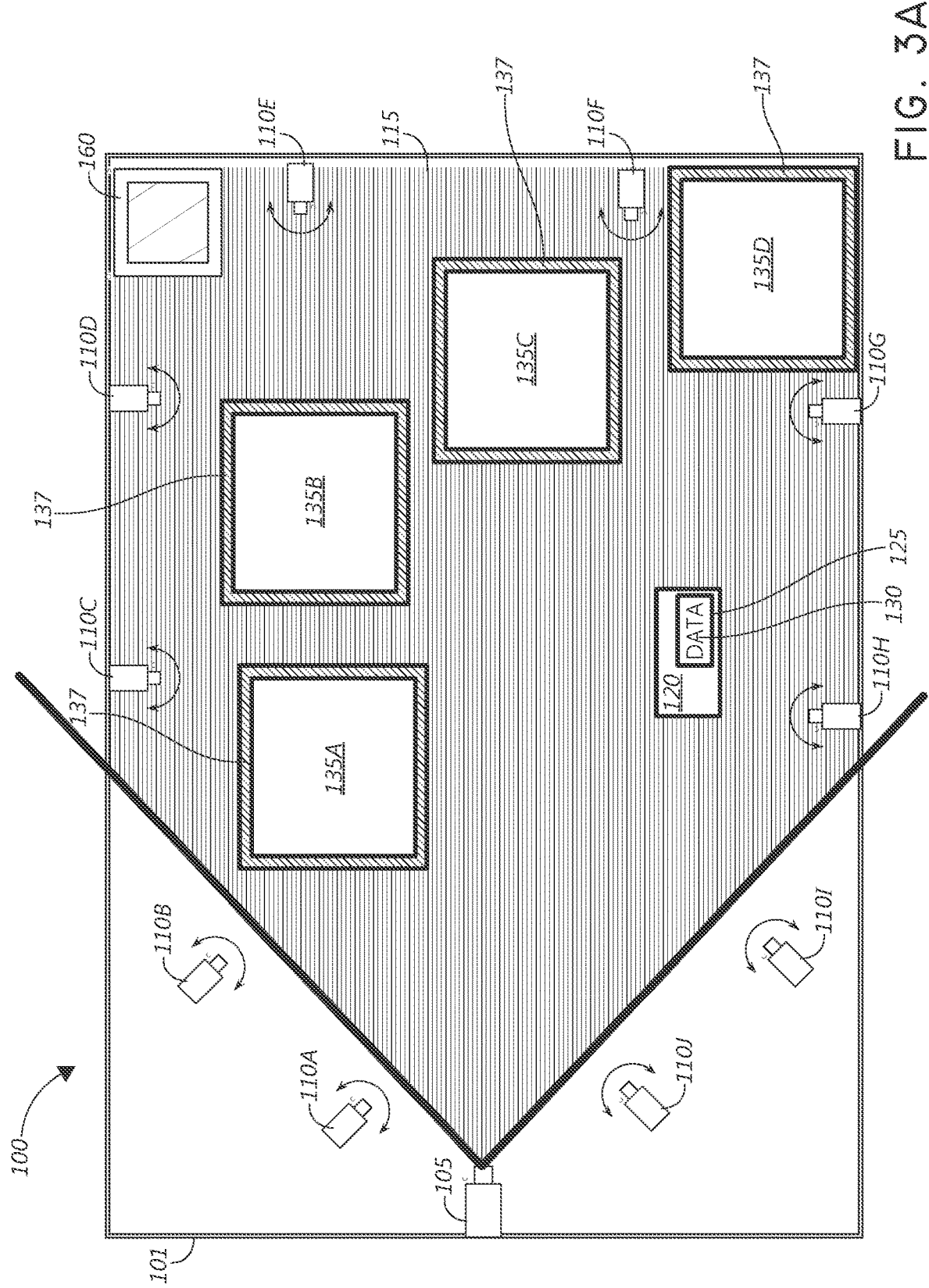
FIG. 3A depicts an example of camera system 100 in a first stage of monitoring an item 120 in a defined physical area.
Figure 3C:
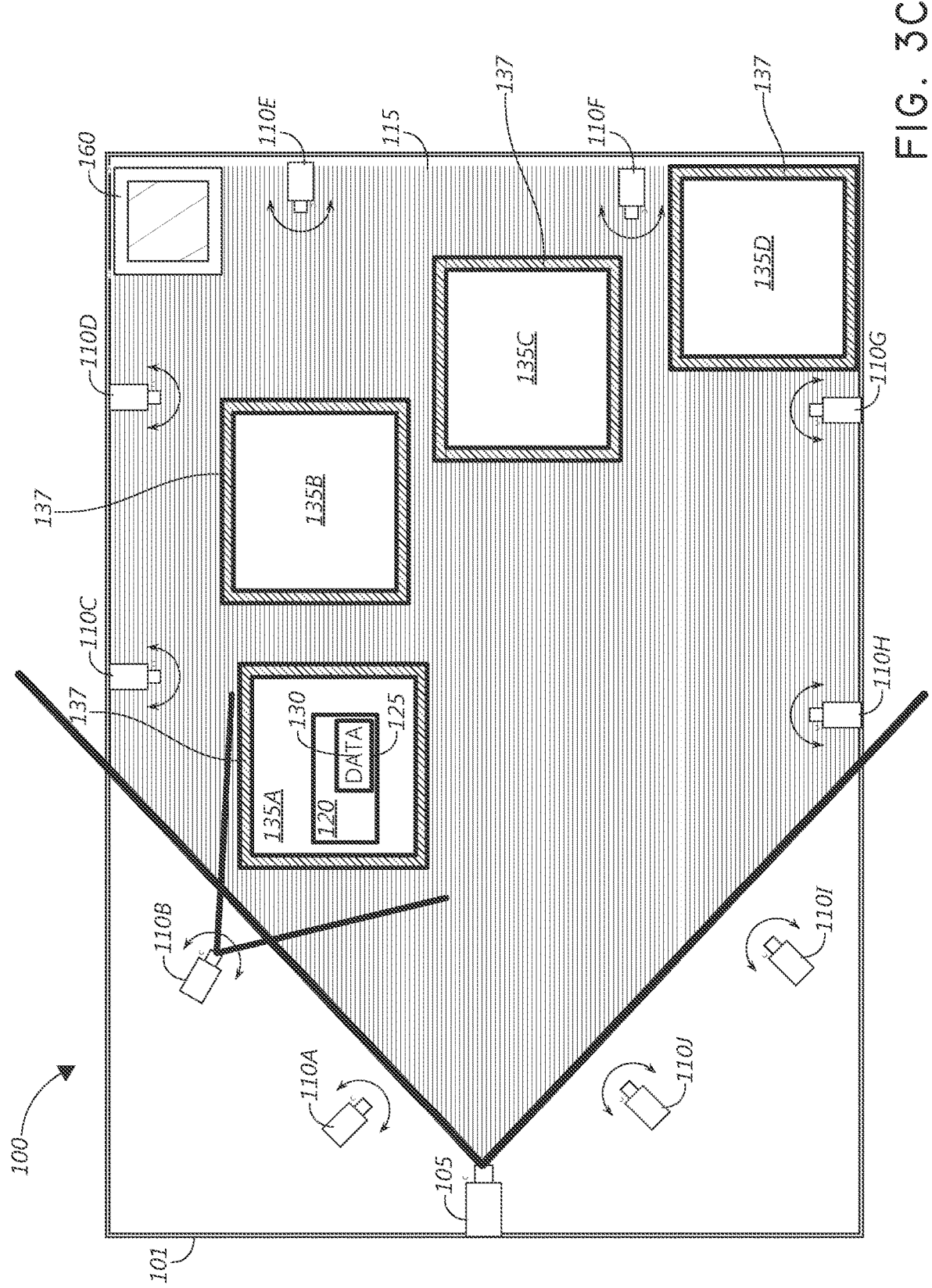
FIG. 3C depicts an example of camera system in a third stage of monitoring an item in a defined physical area.

FIGS. 3A-C depict an example of camera system in various stages of monitoring an item 120. FIG. 3A depicts the camera system 100, the item 120, and a plurality of containers 135A-D positioned within the defined physical area 115. The area around each container 135A-D is marked with high contrast tape 137. The containers 135A-D can comprise a hamper, a bin, a pallet, a box, or other similar device. In some embodiments, the containers 135A-D can be locations of the floor of the room 101 whose spatial coordinates have been associated with a sort area, or which are a virtual container. An item placed within the spatial coordinates corresponding to a container 135A-D which lacks a physical container can be determined to be within the virtual container.

The item 120 can be a package, parcel, envelope, mailpiece or other delivery object of any shape and size. The item 120 includes a region of interest 125 thereon having machine readable data 130. The region of interest 125 can include any segment of the item 120 having readable data that may be detected, captured, and/or processed by the camera system 100. The readable data 130 can include any written, printed, or encoded information that can be detected by and captured by a camera system. For example, the readable data 130 can include, but is not limited to, a barcode, a four-state barcode, such as an Intelligent Mail® barcode, a data matrix barcode, a modulated bar code, a two-state bar code, a Quick Response (QR) code, a destination address, a return address, and/or a source or sender of the item 120. In some embodiments, the readable data 130 can be a handwritten or printed address, delivery point, ZIP code, and the like which can be detected and OCR'd to identify a destination. In some embodiments, readable data 130 can include a barcode or image on a stamp. Readable data 130 may be affixed to, printed on, or written on the item 120. Information that can be extracted from the readable data 130 can include a variety of different types of information associated with the item 120, such as for example, information associated with identifying the item 120, tracking the item 120, a destination of the item 120, a source or sender of the item 120, sorting data, routing information regarding the item 120, or any other item related data.

The readable data 130 can encode an intended delivery destination of the item. After the readable data 130 has been captured by the camera system, the central unit 140 can extract the intended delivery destination from the readable data 130, and compare the intended delivery destination of the item with a sort plan, a facility plan, or other sorting scheme stored in the database 150.

The containers 135A-D can be configured to receive a plurality of items, such as item 120, for storage and/or transport to another location. The containers 135A-D can be physical containers, such as a bin, pallet, and the like, and can also be a defined area, such as a staging area, or a predefined portion of a loading dock, or other part of the room 101. The containers 135A-D can also be any container, area, and the like, desired or useful for segregation or sortation of items according to the readable data 130

As described above, the primary camera 105 can detect the presence of the item 120, as well as the spatial coordinates thereof, as described herein. The primary camera attempts to identify the region of interest 125 of the item 120 as well as the spatial coordinates thereof. If the primary camera 105 can identify the item 120 but cannot identify the region of interest 125, the central unit 140 can instruct one or more of the secondary cameras 110A-J, to pan, tilt, zoom, and/or focus to identify the region of interest 125 on the item 120 and the spatial coordinates thereof. The central unit 140 may instruct one or more of the secondary cameras 110A-J having a field of view of the item 120 to identify the region of interest 125, or may instruct one or more of the secondary cameras 110A-J, such as those closest to the spatial coordinates of the item 120, to identify the region of interest 125 on the item, or to capture an image and send the image to the central unit 140 for processing and decoding.

The spatial coordinates of the region of interest 125 can be transmitted to the central unit 140 for further processing. As described above, the central unit 140 can determine one or more of the secondary cameras 110A-J to capture an image of the region of interest 125. The central unit 140 can also determine one or more adjustments to be performed by the one or more of the secondary cameras 110A-J in order to capture an image of the region of interest, such as pan, tilt, and/or zoom adjustments. In some embodiments, the cameras can detect the spatial coordinates of the item 120 and the region of interest 125. In some embodiments, the central unit 140 can determine the spatial coordinates of the item 120 and the region of interest 125.

As depicted in FIG. 3A, the secondary camera 110H is positioned closest to the item 120 and has the best field of view, depth of field, angle, and the like to capture a high quality image, including a still image or video. In the example depicted in FIG. 3A, the secondary camera 110H is determined by the central unit 140 as the one of the secondary cameras 110A-J to capture an image of the region of interest 125. The central unit 140 can transmit instructions to the secondary camera 110H to perform adjustments in order to capture an image of the region of interest 125 and to capture an image of the region of interest 125.

FIG. 3B depicts an example of the camera system 100 and item 120 following adjustment of the camera 110H. As shown in FIG. 3B the camera 110H has panned in a direction towards the region of interest 125 from the position of the camera 110H shown in FIG. 3A. After adjustment, the camera 110H captures an image of the region of interest 125. The image is transmitted to the central unit 140 for processing. The central unit 140 extracts information from the data 130 of the region of interest 125. As described above, the data 130 can include a variety of different types of information associated with the item 120, such as for example, information associated with identifying the item 120, tracking the item 120, a destination of the item 120, a source or sender of the item 120, sorting data, routing information regarding the item 120, or any other item related data.

In some embodiments, the central unit 140 can receive a feed of images, or a video feed, and determine a spatial coordinate of the region of interest for each image. The change in the spatial coordinates can be extrapolated to determine a likely path the item 120 will travel. The central unit 140 can use the predicted path of travel for the item 120 to instruct other of the secondary cameras 110A-J to move and prepare to take an image or track the item 120 as it moves closer to them or within their fields of view. The actual path of the item 120 through the defined physical area 115 can be stored.

As described above, the readable data 130 can encode an intended delivery destination of the item. After the readable data 130 has been captured by the camera system, the central unit 140 can extract the intended delivery destination from the readable data 130, and compare the intended delivery destination of the item with a sort plan, a facility plan, or other sorting scheme stored in the database 150. The central unit can further determine an intended location, such as containers 135A-D, within the defined physical area 115 into which the item 120 should be placed or deposited based on the intended delivery destination. In some embodiments, the central unit can further determine or assign an employee to transport the item 120 from its location to the intended location for placement of the time 120.

FIG. 3C shows the item 120 paced within container 135A, and imaging and tracking being done by secondary camera 110B, as secondary camera 110B is the closest to the location of the item 120. As the item 120 is placed in the container 135B, the central unit 140 can update the position of the item 120 in the database 150, such as associating the container 135A, including the spatial coordinates of the container 135A, with the item record for the item 120 in the database 150.

FIGS. 3A-C further show the one or more indicators 160. The indicators 160 can be configured to indicate one or more of an item within the defined physical area, such as item 120, the intended location within the defined physical area 115 in which the item should be placed, and an employee assigned to move the item from its location to the intended location. The indicators 160 may include one or more visible, auditory, and/or haptic indicators. In some embodiments, the indicators 160 generate an audio signal to direct placement of the item 120 to the intended location within the defined physical area 115. For example, the indicators 160 may include one or more speakers. In some embodiments, the primary camera 105 and/or one or more of the cameras 110A-J may include a speaker for providing an audio signal to direct placement of the item 120. The audio signal may include a voice recording stating one or more of a name of an employee, an identifier for the item 120, and an assigned name or coordinates of the intended location, such as an identifier for the container 135A-D into which the item 120 should be placed.

In some embodiments, the indicators 160 may provide a visible indication of the intended location in which the item 120 should be placed. In some embodiments, the indicators 160 can include a display screen. The display screen can display one or more of a name of an employee, an identifier for the item 120, and an assigned name or coordinates of the intended location. In some embodiments, the display screen can display a map of the defined physical area 115. The map can indicate the intended location, for example, by a symbol or marker such as a dot. In some embodiments, the map can further show the current location of the item 120, for example, by a symbol or marker such as a dot. In some embodiments, the map can indicate a path from the location of the item 120 to the intended location. In some embodiments, the display screen can display a video providing visual and/or audible indication of the intended location.

In some embodiments, the indicators 160 can include one or more light sources. The one or more light sources can be configured to emit light on one or more of the item 120 and the intended location for placement of the item 120. In some embodiments, the primary camera and/or one or more of the secondary cameras 110A-J can include a light source configured to emit light on one or more of the item 120 and the intended location. In some embodiments, a light source may include one or more motors allowing the light source to pan or tilt within the defined physical area 115. In some embodiments, one or more light sources may illuminate a trail or route within the defined physical area 115 from the location of the item 120 to the intended location. In some embodiments, a light source may be positioned above or directed at each of containers 135A-D. These light sources may be fixed in position, and can be in communication with the central unit 140. When the identifier on the item 120 is read, and when the destination is identified in the central unit 140, the central unit 140 instructs the light source above or directed at the container 135A-D corresponding to the identified destination for the item 120.

The central unit 140 can be configured to communicate with the one or more indicators 160 via the communication module 143. The central unit can transmit instructions to the one or more indicators instructing the indicators to indicate one or more of a name or other identifier of an employee, an identifier for the item 120, and an assigned name or coordinates of the intended location. In some embodiments, communication module 143 can transmit a signal indicating the intended location to a mobile device, such as a mobile phone, in possession of an employee handling the item 120 indicating the intended location of the item 120 within the defined physical area 115. This will identify to the resource, such as a carrier, user, employee, etc., into which container 135A-D the item 120 should be placed.

In the example shown in FIGS. 3A-C, central unit 140 determines that the intended location for placement of the item 120 within the defined physical area 115 is the container 135A. The central unit 140 further instructs the one or more indicators 160 to indicate that the intended location within the defined physical area 115 for placement of the item 120 is the container 135A.

The central unit 140 can also be configured to instruct one or more of the primary camera 105 and the secondary cameras 110A-J to monitor the location of the item 120 within the defined physical area 115, for example, by receiving image data related to the location of the item 120 within the defined physical area 115 and processing the received image data to determine the location of the item 120 within the defined physical area 115. In some embodiments, the one or more indicators 160 can provide an indication of the current location of the item 120 as it is moved within the defined physical area 115 to the intended location. For example, a display screen may show a marker representing the position of the item 120 moving across a map representing the defined physical area 115.

In the example shown in FIGS. 3A-C, the item 120 is moved from the location shown in FIG. 3B and deposited within the container 135A as shown in FIG. 3C. As described above, one or more of the primary camera 105 and secondary cameras 110A-J monitor the movement of the item 120 as it is moved between the location shown in FIG. 3B and the container 135A. Data related to the location of the item 120 can be transmitted from the primary camera 105 and/or secondary cameras 110A-J to the central unit 140 for processing. The processor 141 may determine that the item 120 is deposited within the container based on receipt of image data through one or more of the primary camera 105 and the secondary cameras 110A-J showing the item within or partially within the container 135A. In some embodiments, the processor 141 may determine that the item 120 is deposited within the container based on a determination that the item 120 has passed over the high contrast tape 137. In some embodiments, one of processor 107, processor 141, and processor 112 may perform logical operations to differentiate between the item 120 and the container 135A based on size, shape, or any other detectable characteristic. In some embodiments, the one or more indicators 160 may provide an indication that the item 120 is positioned within the container 135A.

In some embodiments, the container 135A corresponds to a set of spatial coordinates within the defined physical area. For example, the container 135A can be a section of a staging area or a loading dock where items intended for delivery at a common destination or within a common geographical region are staged for delivery. When the item 120 is placed within the spatial coordinates of the container 135A, the central unit 140 records the location of the item 120 within the container and updates the database 150 with the location of the item 120.

While high contrast tape 137 is shown in FIGS. 3A-C, any visible marker designating a particular area of the defined physical area 115 can be recognized by the camera system 100. For example, areas around containers 135A can be designated with paint. In some embodiments, the containers 135A-D may be constructed out of or painted with a high contrast attribute or pattern.

Container 135A also contains a region of interest (not shown) having readable data. The camera system 100 may be configured to detect the region of interest on the container 135A and extract the readable data in the same manner as described above with respect to the region of interest 125 of the item 120. FIG. 3C shows that secondary camera 110B has been adjusted to capture an image of the region of interest of the container 135A. The captured image can be transmitted to the central unit 140 for processing.

The readable data on container 135A can include a variety of different types of information associated with the container 135A, such as for example, information associated with identifying the container 135A, tracking the container 135A, a destination of the container 135A, sorting data, routing information regarding the container 135A, information associated with the items within the container 135A, or any other container related data.

In some embodiments, the camera system can be configured to differentiate between the item 120 and the container 135A based on information encoded in the respective regions of interest of each. The container 135A may include encoded information in its region of interest identifying the container 135A as a container. The item 120 may have encoded information in the data 130 identifying the item 120 as an item. In some embodiments, the camera system 100 can determine that the item 120 has been deposited within the container 135A by determining that the item 120 is positioned at a set of spatial coordinates within a set of spatial coordinates occupied by the container 135A.

After determining that the item 120 has been deposited within container 135A, the processor 141 of the central unit can be configured to process item 120 data and container 135A data to create a record of association between the item 120 and the container 135A. The record of association between the item 120 and the container 135A can be sent to a computing system or database such as computing system 150 for storage, management, or further processing. The record of association between the item 120 and the container 135A can allow for the item 120 and other items within the container 135A to be tracked along with the container 135A if the container 135A is transported to a different location.

Figure 4:
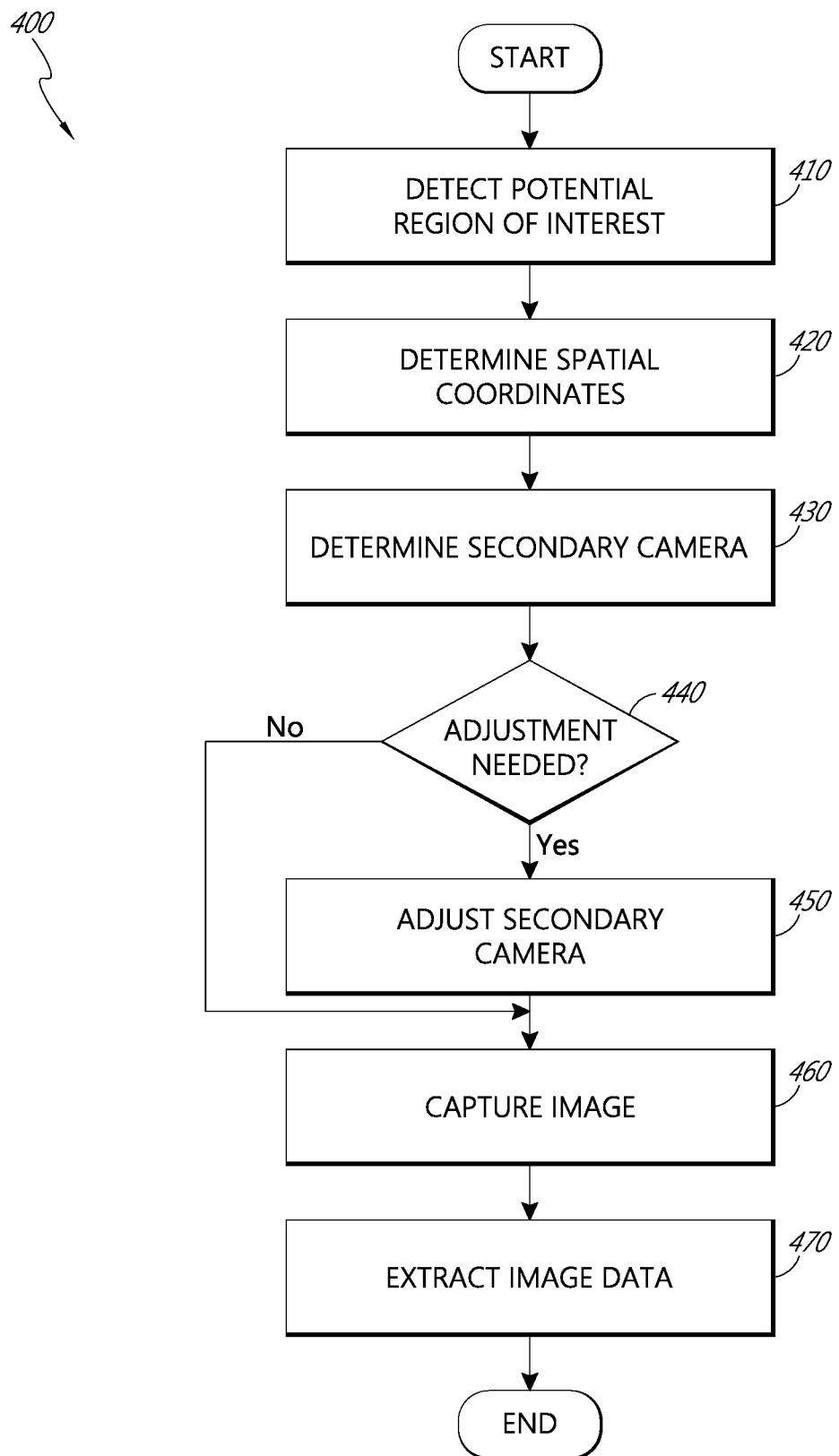
FIG. 4 depicts a flowchart of an exemplary process for determining item data.

FIG. 4 depicts a flowchart of an exemplary process 400 for determining item data. The process begins at step 410, wherein a potential region of interest 125 on the item 120 is detected using the primary camera 105. The primary camera 105 detects the potential region of interest using one or more image sensors 106.

After the potential region of interest is detected, the process 400 moves to a step 420, wherein spatial coordinates for the potential region of interest are determined. The spatial coordinates can be determined by the processor 107 processing data received from the image sensors 106. The spatial coordinates can include x, y, and z coordinates. In some embodiments, spatial coordinates are determined based on distances from the primary camera 105, the angle, depth of field, focus level, of the primary camera 105 when the image is taken. In some embodiments, spatial coordinates may be determined based on a programmed reference map having coordinate data for the primary camera 105 and secondary cameras 110A-J.

After the spatial coordinates of the item 120 are determined, the process 400 moves to a step 430, wherein one or more of the secondary cameras 110A-J is instructed by the central unit 140 or the primary camera 105 to capture an image of the potential region of interest 125. The secondary camera 110 can be determined by the central unit 140 based on spatial coordinate information received from the primary camera 105. The spatial coordinate information can be transmitted from the primary camera 105 using the communication module 108 and received at the central unit 140 using the communication module 143.

After the secondary camera 110 is determined, the process 400 moves to a decision state 440, wherein a decision is made whether the configuration of the secondary camera needs to be adjusted in order to capture an image of the potential region of interest. The processor 141 of the central unit 140 can determine, based on the orientation of the secondary camera and the spatial coordinates of the potential region of interest, whether the secondary camera should undergo a pan, tilt, and/or zoom function in order to be in an appropriate configuration to capture an image of the potential region of interest.

If it is determined in state 440 that the configuration of the secondary camera 110 needs to be adjusted, the process 400 moves to a step 450, wherein the secondary camera 110 is adjusted to an appropriate configuration for capturing an image of the potential region of interest 125. The central unit 140 can transmit instructions for one or more adjustments to the secondary camera 110 via the communication module 143. The instructions can be received at the communication module 113 of the secondary camera 110. The processor 112 of the secondary camera 110 can process the instructions, and in response, actuate one or more of the motors 114 to perform a pan, tilt, and/or zoom function.

After the secondary camera 100 is adjusted to the appropriate configuration, or if a determination is made in state 440 that the secondary camera 110 does not need to be adjusted, the process 400 moves to a step 460 where an image is captured of the region of interest using the secondary camera 110. Instructions to capture the image may be transmitted from the central unit 140 to the secondary camera. The processor 113 of the secondary camera may process the instructions, and in response, actuate the image sensors 111 to capture the image. In some embodiments, the image of a region of interest may be captured, but information from the region of interest, or from the label, is not readable. In this case, an alarm can sound, an error message can be generated, or any other desired response indicating an error or problem. In some embodiments, the cameras may identify an item, but cannot identify a region of interest. This scenario can also result in generating an error message, alarm, and the like. The error scenarios may also result in the processor providing further instructions, such as repositioning the item, stopping movement of the item to allow for capturing an image while stationary in an attempt to improve image quality, taking item to a predetermined location in the facility, scanning the item with a scanner, and the like.

After the image is captured, the process 400 moves to a step 470, wherein data is extracted from the image. The captured image can be transmitted from the secondary camera to the central unit 140. The processor 141 of the central unit 140 can process the capture imaged to extract readable data. The readable data can include any written, printed, or encoded information that can be detected by and captured by the camera system 100, such as, for example, a barcode, a four-state barcode, such as an Intelligent Mail® barcode, a data matrix barcode, a modulated bar code, a two-state bar code, a QR code, a destination address, a return address, and/or a source or sender of the item. Information that can be extracted from the readable data can include a variety of different types of information associated with the item, such as for example, information associated with identifying the item, tracking the item, a destination of the item, a source or sender of the item 120, sorting data, routing information regarding the item, or any other item related data. Extracted data can be stored in the memory 142 or transmitted to external computer system 150 for further managing tracking, and processing.

Figure 5:
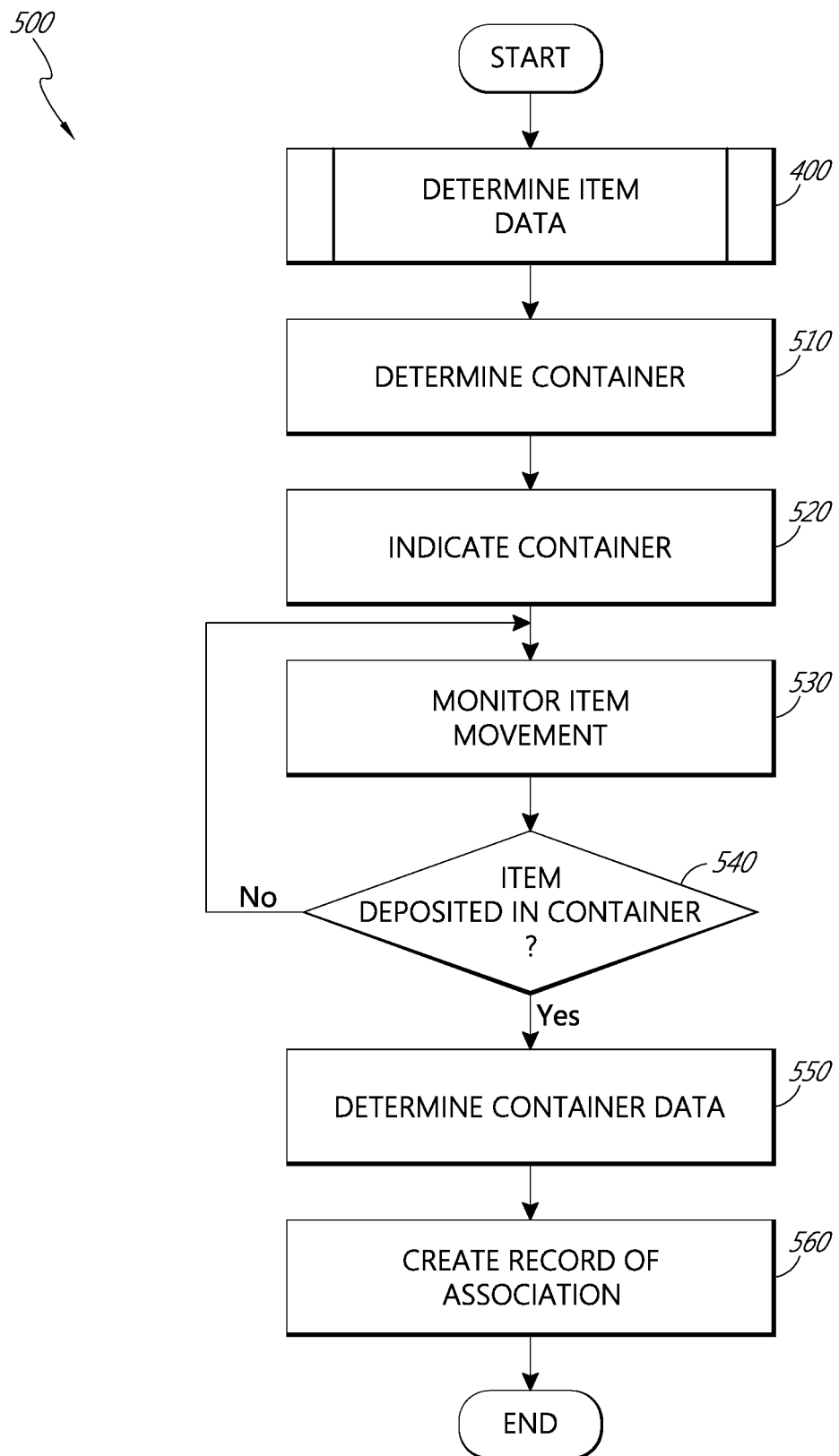
FIG. 5 depicts a flowchart of an exemplary process for associating an item with a container.

FIG. 5 depicts a flowchart of an exemplary process 500 for associating an item with a container within a defined physical area, such as one of the containers 135A. The process 500 begins at a point after process 400 has been performed, and item data is determined for an item, such as item 120, as depicted in FIG. 4.

After item data is determined as described in process 400, the process 500 moves to a step 510 wherein an intended container for placement of the item 120 within the defined physical area 115, such as one of the containers 135A-D, is determined. The intended container can be determined based on a comparison of the determined item data with a sort plan, a facility plan, or other sorting scheme for the defined physical area. For example, in some embodiments, an intended container for placement of the item may be determined based on the intended delivery address of the item. Items 120 that are intended for delivery from a particular facility or to a defined geographic area may be grouped or staged together for transport to another facility, or for delivery from the facility. The processes and system described here can be employed at any level of a distribution network including regional processing facilities, intake facilities, or individual delivery units, such as a local post office.

After the intended container for placement of the item is determined, the process 500 moves to a step 520, wherein the intended container is indicated. The intended location may be indicated by one or more indicators, such as indicators 160 described above. The one or more indicators can provide one or more of a visible, audible, or haptic indication of the intended location. The indicators may further provide instructions for moving the item from a current location to the intended container. The indicators may include one or more lights, display screens, a lighted pathway, speakers, or the like.

After the intended container is indicated, the process moves to a step 530, wherein movement of the item is monitored. The movement of the item can be tracked by one or more of the primary camera 105 and the secondary cameras 110A-J, for example, by receiving image data related to the location of the item within the defined physical area and processing the received image data to determine the location of the item within the defined physical area. In some embodiments, the one or more indicators can provide an indication of the location of the item while it is moved throughout the defined physical area.

After the movement of the item 120 is monitored, the process 500 moves to a step 540, wherein a determination is made whether the item has been deposited in a container, such as one of containers 135A-D. The primary camera 105, secondary cameras 110A-J, or central unit 105, may be configured to process data received from image sensors 106 and/or the image sensors of the secondary cameras to determine that the item was deposited in a container. For example, the processor 141 may determine that the item is deposited within the container based on receipt of image data through one or more of the primary camera 105 and the secondary cameras 110A-J showing the item within or partially within the container. In some embodiments, the processor 141 may determine that the item is deposited within a container based on a determination that the item has moved across high contrast tape defining the periphery of a container, or that the item has been placed at a set of coordinates corresponding to a container. In some embodiments, one of processor 107, processor 141, and processor 112 may perform logical operations to differentiate between the item and the container based on size, shape, or any other detectable characteristic.

If a determination is made that the item has not been deposited within a container, the process returns to step 530, wherein item movement continues to be monitored. If a determination is made that the item has been deposited within a container, the process 500 moves to a step 550, wherein container data is determined. Container data can be determined by the camera system 100 in a similar manner as described for item data in process 400 depicted in FIG. 4. For example, the primary camera 105 can detect a region of interest on the container, as well as the spatial coordinates of the region of interest. The primary camera 105 can transmit data related to the spatial coordinates of the region of interest to the central unit 140. The central unit 140 can process the spatial coordinate data to determine one of the secondary cameras 110A-J that is appropriate to capture an image of the region of interest. The central unit 140 can transmit instructions to the one of the secondary cameras 110A-J to capture an image of the region of interest. The one of the secondary cameras 110A-J can capture an image of the region of interest. The one of the secondary cameras 110A-J can transmit the captured image to the central unit 140. The central unit 140 can process the image to extract readable data. The readable data can include any written, printed, or encoded information that can be detected by and captured by the camera system 100, such as, for example, a barcode, a four-state barcode, such as an Intelligent Mail® barcode, a data matrix barcode, a modulated bar code, a two-state bar code, a QR code, a destination address, a return address, and/or a source or sender of the item. Information that can be extracted from the readable data can include a variety of different types of information associated with the container, such as for example, information associated with identifying the container, tracking the container, a destination of the container, sorting data, routing information regarding the container, information associated with the items within the container, or any other container related data. Extracted data can be stored in the memory 142 or transmitted to external computer system 150 for further managing tracking, and processing.

In some embodiments, the extracted data can be compared to the intended container determination. If a determination is made that the item has been deposited in a container other than the intended container, the one or more indicators may provide an indication of incorrect placement of the item. In some embodiments, the one or more indicators may provide instructions for moving the item from an incorrect container to the intended container.

In some embodiments, a container corresponds to a set of spatial coordinates within the defined physical area. For example, a container can be a section of a staging area or a loading dock where items intended for delivery at a common destination or within a common geographical region are staged for delivery. In some embodiments, a container does not include a region of interest. In some embodiments container data may be determined based on a sort plan, a facility plan, or other sorting scheme for the defined physical area.

After container data is determined, the process 500 can move to a step 560, wherein a record is created associating the item 120 with the container 135 in which the item 120 is deposited. The record of association between the item 120 and the container 135 in which the item 120 is deposited can allow for the item 120 to be tracked along with the container 135, such as via a nesting association, if the container 135 is transported to a different location.

In an alternative embodiment, container data is determined prior to determining whether the item is deposited within the container. In such an embodiment, the container may include encoded information in its region of interest identifying the container as a container. The item may include encoded information in its region of interest identifying the item as an item. The camera system 100 can determine that the item has been deposited within the container by determining that the item is positioned at a set of spatial coordinates within a set of spatial coordinates occupied by the container.

In some embodiments, the location of the item 120 within the predetermined area 115 can be identified using a computing device, such as a mobile delivery device, a smartphone, or a wearable computer. For example, a delivery resource, such as an employee, may wish to find a particular item. The delivery resource can input a unique identifier for the item, such as the identifier encoded within the computer readable code, into the computing device. The computing device can communicate with the database 150 and/or the central unit 140 to retrieve the item location. The central unit 140 can, in response to the query from the computing device, activate the indicator, such as illuminating the container 135 in which the item 120 is located, display the location on a screen, display the location on the computing device, provide an augmented reality-type display on a wearable computer, and the like, to alert the delivery resource to the location of the item 120.

It should be appreciated that while the camera system is described herein with respect to mail distribution, the systems and methods described herein may be applicable to any item that may include machine readable information affixed to and/or printed thereon. In addition, the systems and methods described herein may be used in conjunction with any object that may be imaged and processed to extract information regarding the item.

Implementations disclosed herein provide systems, methods, and apparatus for monitoring a defined physical area. One skilled in the art will recognize that these embodiments may be implements in hardware, software, firmware, or any combination thereof.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It should be noted that the terms "couple," "coupling," "coupled" or other variations of the word couple as used herein may indicate either an indirect connection or a direct connection. For example, if a first component is "coupled" to a second component, the first component may be either indirectly connected to the second component or directly connected to the second component. As used herein, the term "plurality" denotes two or more. For example, a plurality of components indicates two or more components.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In the foregoing description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

Headings are included herein for reference and to aid in locating various sections. These headings are not intended to limit the scope of the concepts described with respect thereto. Such concepts may have applicability throughout the entire specification.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for tracking an item in a distribution network, the system comprising:
   a tracking database;
   a first camera configured to capture first image data indicative of movement of an item within a defined physical area, the item comprising a region of interest; and
   one or more processors configured to:
      receive the first image data from the first camera;
      determine a second camera of a plurality of second cameras to capture second image data indicative of further movement of the item within the defined physical area based on the first image data received from the first camera;
      cause the second camera of the plurality of second cameras to capture the second image data;
      process one or both of the first image data and the second image data to read a code located within the region of interest and identify a location of the item within the defined physical area; and
      update the tracking database based on the code and the identified location of the item within the defined physical area.

2. The system of claim 1, wherein the one or more processors are further configured to determine a location within the defined physical area for placement of the item based on the read code.

3. The system of claim 2, further comprising one or more indicators configured to provide an indication of the determined location within the defined physical area for placement of the item.

4. The system of claim 1, wherein the one or more processors are configured to determine if the item is deposited in a container.

5. The system of claim 4, wherein the one or more processors are further configured to store data associating the item with the container in which the item is deposited.

6. The system of claim 5, wherein the container in which the item is deposited comprises a second region of interest, wherein one or more of the first camera and the plurality of second cameras are configured to capture an image of a second region of interest, and wherein the one or more processors are configured to:
   process the image of the second region of interest to read a second code located within the second region of interest; and create an association between the item and the container in which the item is deposited based on the read code and the read second code.

7. The system of claim 1, wherein one or more of the first camera and the plurality of second cameras are configured to capture an image of a container comprising a second region of interest, and wherein the one or more processors are configured to:
process the captured image of the container to read a second code located within the second region of interest; and
determine an association between the item and the container based on the read code and the read second code.

8. The system of claim 7, further comprising one or more indicators, wherein the one or more indicators are configured to provide an indication of the container based on the determined association between the item and the container.

9. The system of claim 1, wherein the one or more processors are configured to process one or more of the first image data, the second image data, and other image data identify a container configured to receive a plurality of items within the defined physical area.

10. The system of claim 1, wherein the one or more processors are configured to process one or more of the first image data, the second image data, and other image data to differentiate between the item and a container configured to receive the item.

11. The system of claim 1, wherein the second camera is configured to be selectively activated based a location of the region of interest determined based on the first image data received from the first camera.

12. A method for tracking an item in a distribution network, the method comprising:
capturing first image data indicative of movement of an item within a defined physical area by a first camera, the item comprising a region of interest;
determining a second camera of a plurality of second cameras to capture second image data indicative of further movement of the item within the defined physical area based on the first image data;
capturing the second image data by the second camera;
processing one or both of the first image data and the second image data to read a code located within the region of interest and identify a location of the item within the defined physical area; and
updating a tracking database based on the code and the identified location of the item within the defined physical area.

13. The method of claim 12, further comprising determining a location within the defined physical area for placement of the item based on the read code.

14. The method of claim 13, further comprising indicating the determined location within the defined physical area for placement of the item.

15. The method of claim 12, wherein processing one or both of the first image data and the second image data to identify the location of the item within the defined physical area comprises determining that the item was deposited in a container.

16. The method of claim 15, further comprising creating a data record in the tracking database associating the item with the container.

17. The method of claim 16, further comprising:
capturing an image of a second region of interest on the container in which the item is deposited by one or more of the first camera and the plurality of second cameras;
processing the image of the second region of interest to read a second code located within the second region of interest; and
creating an association between the item and the container in which the item is deposited based on the read code and the read second code.

18. The method of claim 12, further comprising:
capturing an image of a container comprising a second region of interest by one or more of the first camera and the plurality of second cameras;
processing the captured image of the container to read a second code located within the second region of interest; and
determining an association between the item and the container based on the read code and the read second code.

19. The method of claim 18, further comprising providing an indication of the container based on the determined association between the item and the container.

20. The method of claim 12, further comprising processing one or more of the first image data, the second image data, and other image data to identify a container configured to receive a plurality of items within the defined physical area.

21. The method of claim 12, further comprising processing one or more of the first image data, the second image data, and other image data to differentiate between an item and a container configured to receive the item.

22. The method of claim 12, further comprising actuating one or more motors to adjust one or more of a horizontal orientation of the determined second camera, a vertical orientation of the determined second camera, and a focal length of a lens system of the determined second camera, wherein the actuating one or more motors is performed based at least in part on a location of the region of interest determined based on the first image data from the first camera.

23. A system for tracking an item in a distribution network, the system comprising:
a tracking database;
a first camera of a plurality of cameras, the first camera configured to capture first image data indicative of movement of an item within a defined physical area, the item comprising a region of interest; and
one or more processors configured to:
receive the first image data from the first camera;
determine a second camera of the plurality of cameras to capture second image data indicative of further movement of the item within the defined physical area based on the first image data received from the first camera;
cause the second camera of the plurality of cameras to capture the second image data;
process one or both of the first image data and the second image data to read a code located within the region of interest and identify a location of the item within the defined physical area; and
update the tracking database based on the code and the identified location of the item within the defined physical area;
wherein one or more cameras of the plurality of cameras are configured to capture an image of a container comprising a second region of interest, and wherein the one or more processors are configured to:
process the captured image of the container to read a second code located within the second region of interest; and determine an association between the item and the container based on the read code and the read second code.

24. A method for tracking an item in a distribution network, the method comprising:
- capturing first image data indicative of movement of an item within a defined physical area by a first camera of a plurality of cameras, the item comprising a region of interest;
- determining a second camera of the plurality of cameras to capture second image data indicative of further movement of the item within the defined physical area based on the first image data;
- capturing the second image data by the second camera;
- processing one or both of the first image data and the second image data to read a code located within the region of interest and identify a location of the item within the defined physical area;
- updating a tracking database based on the code and the identified location of the item within the defined physical area;
- capturing an image of a container comprising a second region of interest by one or more of the plurality of cameras;
- processing the captured image of the container to read a second code located within the second region of interest; and
- determining an association between the item and the container based on the read code and the read second code.

* * * * *